US010101510B2

(12) United States Patent
Arkles

(10) Patent No.: US 10,101,510 B2
(45) Date of Patent: Oct. 16, 2018

(54) BIRD DETERRENT GLASS COATINGS

(71) Applicant: Gelest Technologies, Inc., Morrisville, PA (US)

(72) Inventor: Barry C. Arkles, Dresher, PA (US)

(73) Assignee: Gelest Technologies, Inc., Morrisville, PA (US)

(*) Notice: Subject to any disclaimer, the term of this patent is extended or adjusted under 35 U.S.C. 154(b) by 232 days.

(21) Appl. No.: 15/294,591

(22) Filed: Oct. 14, 2016

(65) Prior Publication Data

US 2017/0102488 A1 Apr. 13, 2017

Related U.S. Application Data

(63) Continuation of application No. 13/969,465, filed on Aug. 16, 2013, now Pat. No. 9,482,786, which is a continuation of application No. 11/702,779, filed on Feb. 5, 2007.

(60) Provisional application No. 60/764,969, filed on Feb. 3, 2006.

(51) Int. Cl.

| | |
|---|---|
| *C03C 17/00* | (2006.01) |
| *B32B 17/00* | (2006.01) |
| *B32B 27/00* | (2006.01) |
| *G02B 5/20* | (2006.01) |
| *G02B 1/04* | (2006.01) |
| *C03C 17/30* | (2006.01) |
| *C03C 17/34* | (2006.01) |
| *A01M 29/08* | (2011.01) |
| *B32B 37/24* | (2006.01) |
| *B32B 17/06* | (2006.01) |
| *C09D 5/32* | (2006.01) |
| *E04B 1/72* | (2006.01) |
| *E06B 5/10* | (2006.01) |
| *G02B 1/11* | (2015.01) |
| *E06B 9/24* | (2006.01) |

(52) U.S. Cl.
CPC ............ *G02B 5/208* (2013.01); *A01M 29/08* (2013.01); *B32B 17/06* (2013.01); *B32B 37/24* (2013.01); *C03C 17/30* (2013.01); *C03C 17/34* (2013.01); *C09D 5/32* (2013.01); *E04B 1/72* (2013.01); *E06B 5/10* (2013.01); *G02B 1/04* (2013.01); *G02B 1/11* (2013.01); *B32B 2037/243* (2013.01); *B32B 2255/26* (2013.01); *B32B 2307/412* (2013.01); *B32B 2307/71* (2013.01); *B32B 2315/08* (2013.01); *C03C 2217/74* (2013.01); *C03C 2218/111* (2013.01); *C03C 2218/112* (2013.01); *E06B 2009/2417* (2013.01); *Y10T 156/10* (2015.01); *Y10T 428/31663* (2015.04)

(58) Field of Classification Search
CPC .. C03C 17/00; B05D 1/36; B05D 1/38; B32B 17/00; B32B 17/06; B32B 17/10; B32B 17/1055; B32B 17/10678; B32B 17/10798; B32B 17/10807; B32B 17/10926; B32B 27/00; B32B 27/08; B32B 27/283

See application file for complete search history.

(56) References Cited

U.S. PATENT DOCUMENTS

| | | | |
|---|---|---|---|
| 3,352,896 A | 11/1967 | Dressler et al. | |
| 3,395,116 A | 7/1968 | Dressler et al. | |
| 4,051,161 A | 9/1977 | Proskow | |
| 4,277,281 A | 7/1981 | Weber et al. | |
| 4,278,804 A | 7/1981 | Ashby et al. | |
| 4,436,924 A | 3/1984 | Ashby et al. | |
| 4,495,360 A | 1/1985 | Anthony | |
| 6,268,457 B1 | 7/2001 | Kennedy et al. | |
| 6,365,765 B1 * | 4/2002 | Baldwin .............. | C08K 5/0008 257/E21.029 |
| 2003/0020049 A1 * | 1/2003 | Payne .................... | C03C 17/30 252/400.31 |
| 2003/0194571 A1 * | 10/2003 | Takaguchi ........... | C09D 183/08 428/447 |
| 2005/0058929 A1 | 3/2005 | Kennedy et al. | |
| 2007/0190343 A1 | 8/2007 | Arkles | |

FOREIGN PATENT DOCUMENTS

EP    1 110 450 A2    6/2001

OTHER PUBLICATIONS

H. Ley, "Experimental Examination of the Perceptibility of Patented Bird-Protecting-Glass to a Sample of Central European Perching Birds," 8 pages (no date).
C. Seewagen, "Bird Collisions with Windows, an Annotated Bibliography," Feb. 2010, 14 pages.
D. Chen, Science, "The Ultraviolet Receptor of Bird Retinas," vol. 225, Jul. 1984, pp. 337-340.
D. Klem, "Biology of Collisions Between Birds and Windows," Jul. 1979, 284 pages.
J Kennedy et al., An Anthracene-Organosiloxane Spin on Antireflective Coating for KrF Lithography.
D. Klem, "Bird Window Collisions," Wilson Bulletin, vol. 101(4), pp. 606-620 (1989).

* cited by examiner

*Primary Examiner* — Jacob T Minskey
*Assistant Examiner* — Matthew Hoover
(74) *Attorney, Agent, or Firm* — Flaster/Greenberg P.C.

(57) ABSTRACT

This invention pertains to UV-absorbing coatings that may optionally be covered with an anti-reflective layer and that are applied to exterior-facing surfaces such as a window or other glass surface that are transparent or translucent. Such coatings are visible to various species of birds, but are generally transparent to humans. The UV absorbing coatings have a silane- or silane-derived chromophore or a combination of a silane- or siloxane-based material and a chromophore, which chromophores absorb UV light at about 300 to about 400 nm. More particularly, the silane- or siloxane-based chromophore is 2-hydroxy-4-(3-triethoxysilylpropoxy) diphenylketone or a derivative thereof.

14 Claims, 2 Drawing Sheets

BIRD DETERRENT GLASS COATINGS

CROSS-REFERENCE TO RELATED APPLICATIONS

This patent application claims priority under 35 U.S.C. § 120 to and is a continuation application of U.S. Non-Provisional patent application Ser. No. 13/969,465, filed on Aug. 16, 2013, entitled, "Bird-Deterrent Glass Coatings", which claims priority under 35 U.S.C. § 129 to and is a continuation of U.S. Non-Provisional patent application Ser. No. 11/702,779, filed Feb. 5, 2007, entitled "Bird-Deterrent Glass Coatings," which claims the benefit under 35 U.S.C. § 119(e) of U.S. Provisional Patent Application No. 60/764,969, filed Feb. 3, 2006, entitled, "Bird Deterrent Glass Coatings," the entire disclosures of which are incorporated herein by reference.

BACKGROUND OF THE INVENTION

Ornithologists estimate that up to one billion birds are killed each year by collisions with windows. These birds inadvertently fly into and collide with windows and glass panes in homes and commercial buildings. These collisions usually involve small songbirds; such as finches, that may fall unnoticed to the ground. The collisions are due primarily to the transparent and reflective nature of glass. In the case of transparent glass, birds see an open path, and in the case of reflective glass, birds see images that appear as a mirror showing familiar escape routes and possible safety zones, and thus, birds fly unaware into the window or other glass surface. The speed and force of such an impact can cause instant death of birds. If birds do not die from such impact, they can be left stunned or fatally injured as a result of brain hemorrhages or other internal bleeding.

Bird deaths of this nature have a detrimental environmental impact. Unlike many other environmental problems, there is no apparent offsetting benefit to humans of such deaths. While many bird deaths could be prevented, this problem has received little public attention, and remains largely unrecognized. Klem, D. Jr., "Presentation at North American Ornithological Conference," St. Louis (Apr. 8, 1998).

Concerned groups, such as the National Audubon Society, have suggested ways to reduce bird deaths resulting from window collisions. Such suggestions include placing decals, objects, or netting on or in front of windows to create an interference pattern to reduce the mirror effect of reflective windows and/or to make transparent windows more visible. However, this can be difficult to do over an entire window or building of windows, and can be unsightly in appearance to homeowners or business owners. Glass may also be tilted, which may provide a temporary, but not a permanent solution. Other proposed solutions include providing glass frits to window or glass panes, so that the window has granules fused thereon to create a frost-like pattern to reduce reflectivity and transparency. However, this is generally cumbersome and can be aesthetically unappealing. Finally, films, such as translucent plastic sheets may be placed on windows to give a more solid appearance. However, this is also not practical on a large scale, can be aesthetically unappealing, and typically will significantly limit visibility to humans.

Other previous attempts to solve the problem of bird collisions are also known. For example, one attempt includes a feather assembly that is made of a length of line including a plurality of brightly colored feathers secured to the line at spaced locations. The line is secured over a glass window in an attempt to prevent bird collisions. Pulse radiation devices have also been used to warn birds of potential hazards such as wind turbine electrical generators. The National Audubon Society's has suggested the use of decals in the shape of spider webs for use with transparent windows. Other similar decals are commercially available from WindowAlert™ of Bend, Oreg. Such decals contain a component that purports to reflect UV sunlight and to act as a neon stoplight for birds. Even if such decals may potentially make a window appear as a solid object without obscuring a human's ability to see through glass, they usually cover only a fraction of a window's surface, leaving the rest of the glass exposed to flying birds. Thus, such decals, to the extent they may be effective, address only part of the problem. Such decals also are not completely transparent or invisible to humans, and do not absorb ultraviolet (UV) light. As a result, they do not appear to be a satisfactory solution to the problems resulting from the transparency of glass over the visual spectrum of birds, the reflective nature of glass and the appearance of bright lights within buildings.

Coatings are known in the art that absorb UV light. They include agents derived from silicones and methoxy-substituted benzophenones as well as organopolysiloxane protective coatings that may contain light absorbing agents. Such coatings, however, are generally directed toward plastic materials to provide UV and scratch resistance.

It is known that many bird species can discriminate wavelengths of light in the near-UV range, which wavelengths are smaller than the threshold wavelengths observable by humans, typically about 400 nm. This is because while humans have three types of photoreceptive cones, birds have an extra cone for quadchromatic color vision. These cones expand their visible light spectrum. Bird eyes, on average, account for about 15% of the mass of the bird's entire head, while human eyes, in contrast, account for less than about 2% of a human head. Furthermore, bird retinas, in contrast to those of humans, do not contain blood vessels, which prevents light scattering such that birds have greater visual acuity activity than humans.

In view of the visual differences between birds and humans and the lack of a satisfactory solution in the art to the problem of bird collisions with windows or other glass surfaces to successfully prevent the significant level of bird deaths, there exists a need in the art for coatings, such as the UV-absorbent coatings described herein which may also be anti-reflective, for windows or other transparent or translucent glass surfaces that are visible to birds, but not to humans. By applying such coatings to windows or other transparent or translucent exterior-facing surfaces, as described herein, such UV-absorbent coatings provide sufficient optical absorption to make them visible to birds, but not to humans, and birds may be deterred from flying into windows.

BRIEF SUMMARY OF THE INVENTION

The invention includes a UV-absorbing coating capable of deterring birds from collision with a substrate having the coating thereon comprising, at least one of: (a) a silane- or siloxane-based chromophore capable of forming stable bonds with a substrate, and absorbing light at about 300 nm to about 400 nm; and (b) a composition comprising a silane and/or a siloxane and a chromophore, wherein the silane and/or siloxane is capable of forming stable bonds with a substrate, and the chromophore is capable of absorbing light at about 300 nm to about 400 nm, wherein the UV absorbing coating is visible to birds appears generally transparent to humans.

A method of preventing birds from colliding with a substrate is also included within the invention which method comprises applying to at least a portion of a substrate a UV-absorbing coating. The UV-absorbing coating comprising at least one of: (a) a silane- or siloxane-based chromophore capable of forming stable bonds with a substrate, and absorbing light at about 300 nm to about 400 nm; and (b) a composition comprising a silane and/or a siloxane and a chromophore, wherein the silane and/or siloxane is capable of forming stable bonds with a substrate, and the chromophore is capable of absorbing light at about 300 nm to about 400 nm. The substrate having the coating applied thereon is visible to birds, but generally transparent to humans.

In one embodiment, the invention includes a coated substrate capable of deterring birds from collision with a substrate having the coating thereon. The coated substrate comprises at least one of: (a) a silane- or siloxane-based chromophore capable of forming stable bonds with a substrate, and absorbing light at about 300 nm to about 400 nm; and (b) a composition comprising a silane and/or a siloxane and a chromophore, wherein the silane and/or siloxane is capable of forming stable bonds with a substrate, and the chromophore is capable of absorbing light at about 300 nm to about 400 nm. The coated substrate is visible to birds, but generally transparent to humans.

DETAILED DESCRIPTION OF THE INVENTION

Figure 1:
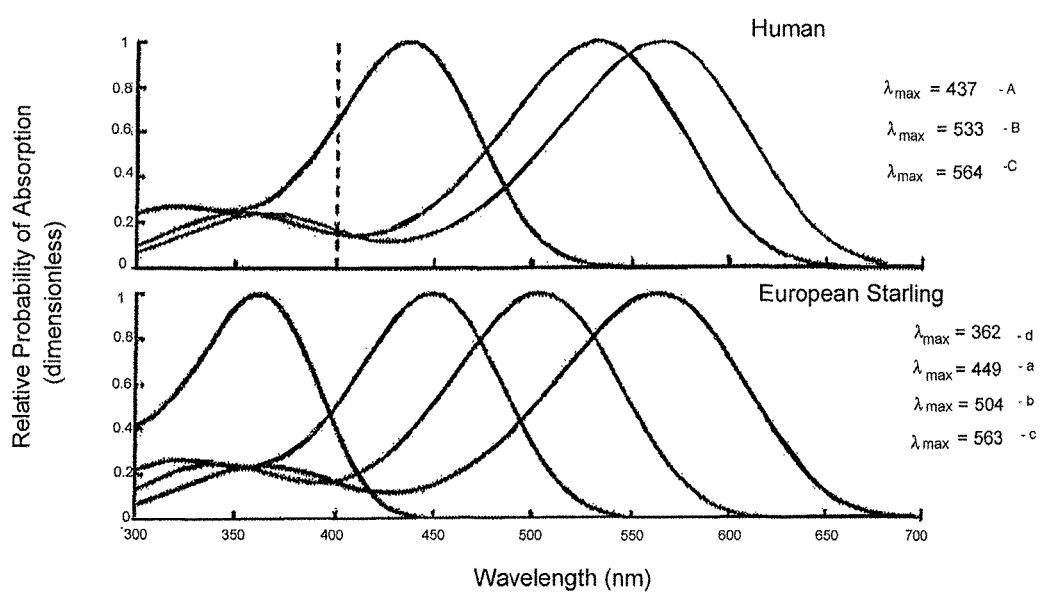
FIG. 1 is a graphical representation depicting the differences in the visual acuity of birds and humans, as illustrated by a probable absorption spectra for swallows and humans.

The present invention relates to the field of UV-absorbing coatings for transparent or translucent exterior surfaces including windows and other glass treatments, which coatings are also preferably anti-reflective and UV-absorbing coatings. The invention includes within its scope such coatings, as well as a method for preventing birds from colliding with a substrate using such coatings and substrates coated with such coatings. The UV-absorbing coating of this invention is a silane- or siloxane-based coating that may include a silane- or siloxane-based chormophore component and/or a composition comprising a silane- or siloxane-based component and a chromophore. The silane- or siloxane-based chromophore and the chormophore used in any silane- or siloxane-based composition is preferably one that absorbs in the range of about 300 nm to about 400 nm, and more particularly in the range from about 325 nm to about 400 nm.

The preferred silane- or siloxane-based chromophore is preferably a hydroxy diphenylketone or a derivative thereof. If a chromophore is added independently to a silane- or siloxane-based composition, it may be any choromophore which is compatible with the composition and which preferably absorbs light in the wavelength regions noted above.

The UV absorbing coating preferably includes either a silane- or siloxane-based chromophore or other silane- or siloxane-based component (for use with an independent choromophore additive) is also preferably capable of forming stable bonds with a substrate such as glass, windows or other transparent or translucent substrates.

The UV-absorbing coating may be used to coat various substrates including any transparent or translucent interior or exterior surface, such as, without limitation windows and other glass surfaces, and preferably including, but not limited to, silicon-based materials or other siliceous substrates. The coating solution can be applied either uniformly and/or completely over the substrates or partially, including for example, in patterns such as stripes or other similar configurations. Such stripes or patterns can be of a wide variety of sizes and shapes so long as they serve the intended purpose. Coatings according to the present invention are preferably capable of forming durable chemical bonds to such preferred substrates and are able to remain generally, and preferably substantially completely or completely transparent in the range of human visual acuity while remaining visible to various bird species.

In a preferred embodiment an anti-reflective coating is applied to the exterior facing surface of the UV-absorbing coating. Preferably such anti-reflective coating is on the exterior facing surface regardless of whether the UV-absorbing coating is applied to the exterior- or interior-facing surface of the substrate. As used herein, "interior-facing" and "exterior-facing" are used to indicate directions toward and away from the exterior of a building or other outside structure exposed to flying birds.

Transparent or translucent substrates such as windows and other glass treatments that are coated in this manner are capable of deterring birds from flying into them and of preventing bird death by absorbing, not merely reflecting, UV light, which may extend into the range of about 425 nm. These deep purple wavelengths are barely observable by humans, but are observable by birds. A UV spectrum illustrating the differences in the visual acuity of birds and humans is depicted in FIG. 1. Wavelengths A, B and C in the Human spectra exceed this deep purple wavelength as does wavelengths a, b and c in the Bird spectra. However, wavelength d in the Bird spectra is within this wavelength range allowing the coating to be visual to birds but not humans.

The silane- or siloxane-based coating of the present invention may be directly applied to transparent or translucent exterior-facing or interior-facing surfaces. In one preferred embodiment, the silane- or siloxane-based material is a chromophore, and the group providing the choromophore is preferably bound to silicon in the molecule. The chromophore group and/or the choromophore provided if an independent chromophore is added to a composition in the UV-coating preferably absorbs UV light at from about 300 nm to about 400 nm. Other substitutions on the silicon atoms in the chromophore may be provided to allow reaction with silicious substrates and/or to facilitate polymerization and/or resin-forming reactions for binding the silane- or siloxane-based material to other similar molecules and/or to the substrate.

The silane- and/or siloxane-based UV-absorbing coatings of the present invention may be applied to various transparent or translucent substrate surfaces using varying techniques known or to be developed in the art. For example, the coating may be applied to such a surface using resin and/or polymer coating techniques, including reacting the compound through solvent or other coating techniques such that it polymerizes in situ, or by incorporating the silane- or siloxane-based materials and/or any additional chromophores in a composition which may be applied as a wax, polish or other composition to the surface. In addition, the coatings may be applied by dip-coating techniques well known in the art of UV-absorbing and/or antiflective coating application using solvents and/or sol-gel techniques. Alternatively, the components of the coatings herein may be suspended in an aerosol or similar airborne solution and sprayed onto the substrate surface as an aerosol spray. The silane- or siloxane-based material once sprayed-on the substrate then polymerizes to the substrate surface forming stable bonds thereon. Further, it is within the scope of the invention to provide the coatings to a flexible film substrate such as a transparent or translucent polyolefin or polyvinyl-based film, such as Mylar, such that the films may be then applied to an exterior-facing surface using standard film application techniques including providing an adhesive layer to the back surface of the film, applying adhesive to the film or surface prior to application and/or static bonding techniques.

Such sprays or resin/polymer-based coatings, dip coating formulations (which should be primarily solvent based prior to drying), waxes, polishes or films having coatings thereon, may contain additives within the coatings or coating composition which are known or to be developed in the anti-reflective and/or UV-absorbing coating arts for physical or light property modification such as, but not limited to anti-slip agents, surfactants, fire retardants, antioxidants, age resisting agents, plasticizers, tackifiers, silane coupling agents, mildewproofing agents, release agents, disperants, flatting agents, heat stabilizers, light stabilizers, wetting agents, extenders, thixotropic agents, viscosity modifiers, lubricants, impact modifiers, tougheners, colorants such as dyes and pigments (to the extent they do not otherwise interfere with the purpose of the invention herein), clarifying agents, solvents, propellants and/or waxes. Such additives may be provided in amounts typically used in the art and preferably collectively make up no greater than 50 percent by weight of the resulting coating and no more than about 30 percent by weight of the coating composition. The components may be combined and/or the coatings applied using any suitable techniques known or to be developed in the art.

The coatings of the present invention preferably include at least one silane- or siloxane-based chromophore, such as, but not limited to, 2-hydroxy-4-(3-triethoxysilylpropoxy) diphenylketone, a hydrolysate of 2-hydroxy-4-(3-triethoxysilylpropoxy)diphenylketone, a co-hydrolysate of 2-hydroxy-4-(3-triethoxysilylpropoxy)diphenylketone with at least one other alkoxysilane. Compounds of this type have been used as UV stabilizers, but their use for this U.V. or opacifier purpose has not been previously studied. Additional silane- or siloxane-based chromophores for use in the present invention include O-4-methylcoumarinyl-N-[3-(triethoxysilyl)propylcarbamate], 3-(2,4-dinitrophenylamino)propyltriethoxysilane, 7-triethoxysilylpropoxy-5-hydroxyflavone, and N-triethoxysilylpropyl-O-quinineurethane. In addition, derivatives and combinations of the above-referenced silane- and siloxane-based chromophores may be used within the scope of the invention.

The application of the silane of the present invention to transparent or translucent exterior surfaces including windows and other glass treatments may be performed in any manner known in the art or to be developed, as noted above. In such techniques it is preferred that the alkoxy groups in the silane- or siloxane-based compounds are displaced by hydroxy groups on the exterior-facing surface of the substrate receiving the coating. Alternatively, it is preferred that the compounds are applied through use of a silanol-rich intermediate derived from a silane- or siloxane-alone, or by condensation with other such silanes or siloxanes. Preferred UV-absorbing silane- or siloxane-based choromophores of this invention are those that absorb UV light at about 350 nm to about 400 nm, with extinction coefficients greater than about 50,000.

Example 1

Figure 2:
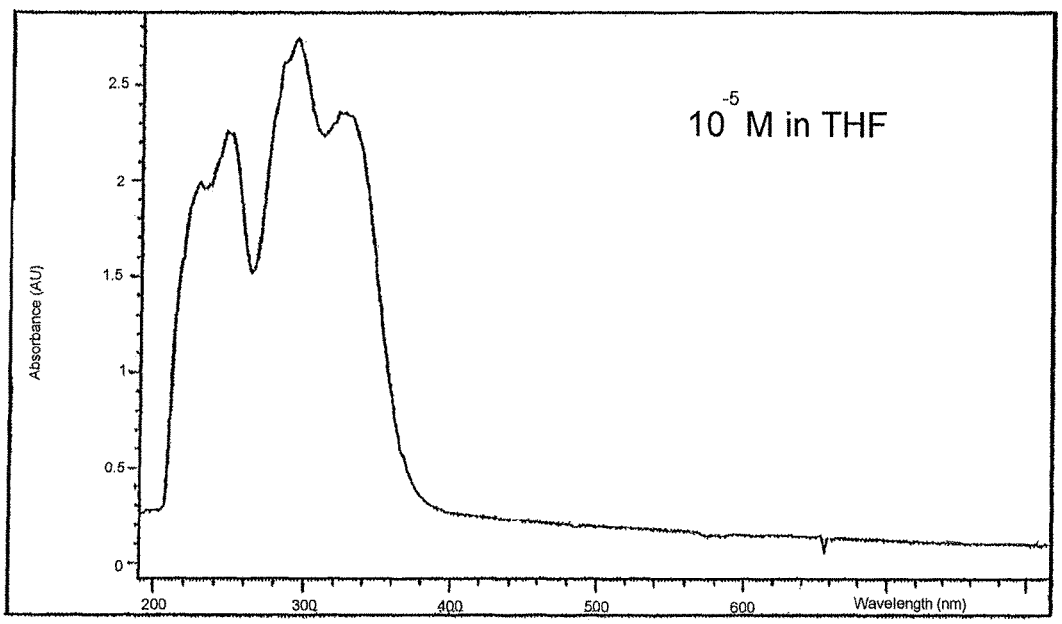
FIG. 2 is a UV absorption spectragraph of 2-hydroxy-4-(3-triethoxysilylpropoxy) diphenylketone in tetrahydrofuran solution.

A 10% solution of 2-hydroxy-4-(3-triethoxysilylpropoxy) diphenylketone is prepared in tetrahydrofuran. Water in the amount of 1.5 molar equivalents is then added to the solution. The solution is aged twenty minutes to allow partial hydrolysis of the ethoxy groups. The solution is then applied to at least a part of a transparent or translucent exterior surface, for example, a window, or other glass treatment, in the form of an aerosol spray or a resin. A UV spectral analysis of this solution in depicted in FIG. 2. At temperatures of about 15° to about 30° C., a clear, anti-reflective layer may be optimally, and is preferably, applied to the exterior facing surface of the UV-absorbing coating. The anti-reflective layer may be in the form of a transparent membrane and may be attached to the UV-absorbing layer by use of an adhesive bead, strip, tape, foam, sealant, or by chemical bonding. Such coated transparent exterior surfaces, such as windows and other glass treatments, help to deter birds from collisions and resulting harm.

Example 2

A 1 liter flask was equipped with a mechanical stirrer, pot thermometer addition funnel and distillation head. It was charged with 460 g of isopropanol, 113 g of methyltrimethoxysilane and 50 g of dimethyldimethoxysilane, and stirring was commenced. To this, 37 g of water 0.1 g of tetramethylammonium hydroxide and 0.4 g of formic acid were added rapidly, and the flask was heated to reflux until a clear solution resulted. Approximately 150 g of a mixture of methanol and isopropanol were removed by distillation. The pot was allowed to cool and 5 weight percent of 2-hydroxy-4-(3-triethoxysilylpropoxy)diphenylketone was added to the solution.

Example 3

The resin solution of the present solution was applied to glass substrates by dipping, resulting in a visually clear coating that cured to form an adherent film at room temperature. In some cases streaking was observed. The streaking was eliminated by diluting the resin solution with an equal volume of isopropanol.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:
1. A coated substrate, comprising
   (a) a transparent substrate having at least one surface including at least one exterior facing surface, and a coating on at least a portion of the at least one exterior facing surface of the transparent substrate, wherein the coating deters birds from colliding with the transparent substrate, and the coating comprises:
   at least one of:
      (i) a silane- or siloxane-based chromophore capable of forming stable bonds with the substrate, absorbing light at about 300 nm to about 400 nm and remaining transparent to humans, wherein the silane- or siloxane-based chromophore; and
(ii) a composition comprising a silane and/or a siloxane and a chromophore, wherein the silane and/or siloxane is capable of forming stable bonds with the substrate, and the chromophore is capable of absorbing light at about 300 nm to about 400 nm, and
(b) an anti-reflective layer on an exterior facing surface of the coating,
wherein the coating is perceived as opaque by a bird but is perceived as transparent by humans when viewed from an interior or an exterior of the transparent substrate.

2. The coated substrate according to claim 1, wherein the silane- or siloxane-based chromophore is chosen from a hydroxyl diphenylketone or a derivative thereof.

3. The coated substrate according to claim 2, wherein the silane- or siloxane-based chromophore is 2-hydroxy-4-(3-triethyoxysilylpropoxy)diphenylketone or a derivative thereof.

4. The coated substrate according to claim 1, wherein the coating is applied by spraying, dip-coating, or film- or resin-coating techniques.

5. The coated substrate according to claim 1, wherein the anti-reflective layer is a transparent membrane.

6. The coated substrate according to claim 1, wherein the anti-reflective layer is attached to the coating by at least one of an adhesive bead, a strip, a tape, a foam, a sealant, and a chemical bond.

7. The coated substrate according to claim 1, wherein the transparent substrate is a glass substrate and/or a window.

8. The coated substrate according to claim 1, wherein the silane- or siloxane-based chromophore absorbs light at about 325 nm to about 400 nm.

9. The coated substrate according to claim 1, wherein the silane- or siloxane-based chromophore is selected from the group consisting of a hydrolysate of 2-hydroxy-4-(3-triethoxysilylpropoxy)diphenylketone, a co-hydrolysate of 2-hydroxy-4-(3-triethoxysilylpropoxy)diphenylketone with at least one other alkoxysilane, O-4-methylcoumarinyl-N-[3-(triethoxysilyl)propylcarbamate], 3-(2,4-dinitrophenylamino)propyltriethoxysilane, 7-triethoxysilylpropoxy-5-hydroxyflavone, N-triethoxysilylpropyl-O-quinineurethane and derivatives and combinations thereof.

10. The coated substrate according to claim 1, wherein the chromophore is capable of absorbing light at about 325 nm to about 400 nm but does not absorb light in a range visually perceived by humans.

11. A coated substrate, comprising
(a) a transparent substrate having at least one surface including at least one exterior facing surface and a coating on at least a portion of the at least one exterior facing surface of the transparent substrate, wherein the coating deters birds from colliding with the transparent substrate, and the coating comprises:
at least one of:
(i) a silane- or siloxane-based chromophore capable of forming stable bonds with the substrate, and absorbing UV light, wherein the silane- or siloxane-based chromophore is chosen from hydroxyl diphenylketone or a derivative thereof; and
(ii) a composition comprising a silane and/or a siloxane and a chromophore, wherein the silane and/or siloxane is capable of forming stable bonds with the substrate, and the chromophore is capable of absorbing UV light, and
(b) an anti-reflective layer on an exterior facing surface of the coating,
wherein the coating is perceived as opaque by a bird but is perceived as transparent by humans when viewed from an interior or an exterior of the transparent substrate.

12. The coated substrate according to claim 11, wherein the silane- or siloxane-based chromophore is chosen from hydroxyl diphenylketone or a derivative thereof.

13. The coated substrate according to claim 11, wherein the chromophore is capable of absorbing light at about 300 nm to about 400 nm.

14. The coated substrate according to claim 13, wherein the chromophore is capable of absorbing light at about 325 nm to about 400 nm.

* * * * *